Aug. 27, 1963 F. P. CIRONE ET AL 3,102,168

SUPERVISORY CIRCUITS FOR TELEPHONE SUBSCRIBER'S LINE

Filed Dec. 24, 1959 2 Sheets-Sheet 1

INVENTORS F. P. CIRONE
T. N. LOWRY
BY
S. E. Hollander
ATTORNEY

SUPERVISORY CIRCUITS FOR TELEPHONE SUBSCRIBER'S LINE

Filed Dec. 24, 1959 2 Sheets-Sheet 2

INVENTORS F. P. CIRONE
T. N. LOWRY
BY
S. E. Hollander
ATTORNEY

United States Patent Office 3,102,168

Patented Aug. 27, 1963

3,102,168

SUPERVISORY CIRCUITS FOR TELEPHONE SUBSCRIBER'S LINE

Frank P. Cirone, Dover, and Terrell N. Lowry, Boonton, N.J., assignors to Bell Telephone Laboratories, Incorporated, New York, N.Y., a corporation of New York Filed Dec. 24, 1959, Ser. No. 861,911
22 Claims. (Cl. 179—18)

This invention pertains to supervisory circuits and more specifically to supervisory circuits utilized to determine the condition of subscriber subset loops in a telephone switching system.

It has been found advantageous in telephone switching systems to utilize remote line concentrator systems which include equipment positioned remote from the central office for connecting a given number of subscriber subset loops to a lesser number of trunks to the central office to appreciably reduce the cost of outside plant materials. In such a system the subscribers are not directly connected to a central office, and switching equipment must be provided to make the connections therebetween. The switching equipment which makes the actual connection between a subscriber and a trunk resides in the remote concentrator, and its use is shared by all of the subscriber subset loops connected to that concentrator to further reduce duplication and expense.

The switching requirements of a remote line concentrator are determined by the type of service of which a customer is desirous, i.e., a service request requires that a subscriber be connected to the central office while a hang-up requires that the subscriber be disconnected therefrom to allow use of the trunk by other subscribers. The switching required by the subscriber service needs is controlled by equipment which, upon being apprised of the subscriber needs, determines what connections are required therefor and influences the physical switching circuitry to make those connections. This equipment, which will be described hereinafter as switching control circuitry, normally resides in the central office. This invention deals with the circuitry necessary to apprise the switching control circuitry of the service needs of the subscriber, the subscriber subset monitoring or supervisory equipment.

In most telephone systems, subscriber subset loops display unique direct-current conditions for the "on-hook" and "off-hook" states. The direct-current condition of the subscriber loop thus is indicative of the on-hook or off-hook state of the subset, and knowledge of this condition may be utilized by the supervisory equipment for apprising the switching control circuitry of the service needs of the subsets of such a remote concentrator. Physically, since the conditions to be noted are direct-current conditions, the supervisory equipment is connected to the individual subset loops. In an alternating-current coupled line concentrator wherein no direct-current paths are available to the central office, the supervisory equipment resides within the remote concentrator system and includes means for relaying signals indicative of loop conditions to the switching control in the central office.

Subscriber switching is primarily required in a remote concentrator system when the condition of a subset changes. Therefore a supervisory circuit should be capable of apprising the switching control circuitry of such changes in the direct-current condition of the subset loop. Since different switching functions are required by the various changes, however, it is desirable that the supervisory circuitry be capable of signaling the type of change which has taken place in the loop to the switching control circuitry which makes the physical switching changes necessary. If the supervisory equipment contains certain memory elements and is capable of signaling the type of change taking place in the subset, equipment in the switching control circuitry for remembering the prior conditions of all of the subsets to determine when a change-of-condition has taken place can be eliminated. To this end it is desirable that a supervisory circuit provide unique output signals indicative of the individual changes-of-condition in a subset loop.

Various supervisory circuits are known in the prior art. There are many problems which arise with respect to any circuit utilized in this capacity however. For example, a supervisory circuit which is capable of signaling unique changes-of-condition must produce at least two output signals. An especially desirable attribute of any circuit providing two or more different output signals relates to the ability of the circuit to provide signals which are clearly distinguishable, one from the other, since equipment functioning in response thereto may be less complex. Some prior art supervisory circuits, though completely operative, are incapable of accenting differences in conditions measured to provide easily distinguishable output signals indicative thereof.

To eliminate duplication in a remote line concentrator, a single piece of equipment, known as scanning equipment, may be utilized to transmit the information from the supervisory circuits of the individual subset loops to the switching control circuitry. This equipment is connected to interrogate the individual subset loops in time sequence. When supervisory equipment capable of providing change-of-condition information is utilized in remote line concentrator systems with scanning equipment, a second problem arises. For use with such scanning equipment a supervisory circuit should be capable of storing a change-of-condition signal for a period sufficient to allow the scanning equipment to interrogate all of the subset loops of the remote concentrator. Without such capability, a change-of-condition signal might be missed by the scanner.

In addition, it is desirable that the supervisory equipment present but a single signal to the switching control circuitry for any loop condition change. Initiation of a plurality of such change signals for a single change in the subset loop, as presented by many prior art circuits, requires that the switching control circuitry include equipment for ignoring the later signals, an additionally complicating factor. It is therefore desirable that the supervisory equipment be capable of furnishing a single unique output signal persevering for at least one scanning cycle for each change-of-condition in the loop.

A problem which has arisen in prior art supervisory circuits relates to the various disturbances which may affect the operation thereof. For example, in a subscriber subset loop, certain external influences tend to produce currents which may affect the measurement of the direct-current codition of the subset. Fluctuating current in lines running parallel and adjacent to the wires of the subset loop creates magnetic fields which may induce currents in the subset loop to affect the measurement of the condition thereof. An alternating-current coupled subset loop may comprise a subscriber subset connected to a transformer by two wires which are physically adjacent and parallel. It is advantageous to maintain the wires of a subset loop in the parallel position since any external magnetic fields then induce equal but opposed currents in each wire of the subset which advantageously cancel each other. These induced currents are known as longitudinal currents.

Though they have no effect on the subset itself, which is substantially isolated from ground, the longitudinal currents do affect the condition of the circuit in varying degrees for measurements at specific points around the loop with respect to a reference potential. The changes occasioned by longitudinal currents affect the determination of the direct-current condition or change therein in an obviously undesirable manner. The circuits provided for supervising the condition of a subset loop should therefore be such that longitudinal currents have no effect on the results of the determination.

A supervisory circuit used to determine the direct-current condition of a subscriber subset loop should be impervious in its determinations, not only to longitudinal disturbances in the loop, but also to normal shifts in the direct-current loop voltage within an operating region and to the usual alternating-current signals in the loop, such as ringing and voice currents, for instance. Additionally, the supervisory circuit should create no signals of an audible frequency capable of affecting the loop adversely by interference with voice or ringing signals.

Various supervisory circuits expend considerable power in operation. As in any system utilized to serve a large number of customers, the initial and operating costs of the various circuits included therein are of prime importance. The utilization of power becomes especially important, however, where in addition the furnishing of power to certain circuits is expensive due to the lack of proximity of those circuits to other elements of the system, as is the case with remote concentrators. Therefore, the number and cost of elements in any supervisory circuit adapted for use in the remote concentrator portions of a telephone system and the operational power requirements thereof should be held to a minimum.

In view of the foregoing it is an object of this invention to provide improved supervisory circuits for determining the switching requirements of subscriber subsets.

Another object of this invention is to provide improved supervisory circuits for determining changes in the direct-current condition of a subscriber subset loop.

A further object of this invention is to provide supervisory circuitry capable of producing a unique signal for each change-of-condition in a subscriber subset loop.

Another object of this invention is to provide clearly distinguishable output signals from supervisory circuits indicative of the various conditions and changes-of-condition in subscriber subset loops.

It is another object of this invention to reduce complication in a telephone switching system by providing supervisory circuits capable of storing change-of-state signals for an indefinite period and divulging but a single signal upon interrogation.

A further object of this invention is to render supervisory circuits substantially indifferent to longitudinal, voice, and ringing currents in the subset loop and, additionally, to provide supervisory circuits which do not adversely affect the subset loop.

An additional object of this invention is to eliminate any effect of direct-current voltage shifts within an operating condition on the supervision of a subset loop.

A further object of this invention is to reduce the power consumption of supervisory equipment used in remote concentrators and to utilize a minimum of elements in such equipment.

Briefly, the foregoing objects are accomplished in accordance with aspects of this invention by a group of supervisory circuits which incorporate novel memory elements for providing change-of-condition indications. Whereas the use of a capacitor-diode series arrangement has heretofore been strenuously avoided in pulse circuits wherein the charging time of the capacitor is of a like order to the duration of pulses due to the "blocking-up" effect of such an arrangement, the circuits of this invention utilize this effect to provide destructive readout of changes-in-condition in the subset loop. A capacitor and a diode in series in circuits for transmitting pulses of a single polarity wherein capacitor charging time is of an order of pulse duration exhibit a blocking effect on the later pulses of a series. A pulse which is capable of forward biasing the diode for transmission thereby changes the voltage across the series capacitor during its application thereto. This change in voltage tends to charge the capacitor so that upon the removal of the pulse the diode becomes biased in its nonconducting region. This effect is normally undesirable and therefore avoided since succeeding pulses of the same polarity and amplitude are impeded by the blocking-up of the circuit. Opposite polarity pulses on the other hand further increase the bias causing nonconduction by the diode and are incapable of enabling it. Thereafter, only pulses larger than the blocking potential are capable of being transferred by such an arrangement.

This invention advantageously utilizes this priorly undesirable blocking-up characteristic to provide destructive readout of change-of-condition signals. By utilizing a Zener diode rather than a standard diode the circuit is purposely designed to "block-up" in the center of the nonconducting Zener region of the diode for pulses of both polarities of an amplitude less than one-half of the Zener value. The circuit may be unblocked by a change of sufficient amplitude in either polarity direction.

The circuits of this invention utilize the change in loop voltage condition to provide changes sufficient for unblocking in either direction. By adjusting the time constant of the capacitor to be such that a single transmitted interrogating pulse following a change in loop condition accomplishes the "block-up," the circuits provide a single output pulse for any change in loop condition in either polarity direction and thus accomplish destructive readout of the change.

The capacitor-Zener diode arrangement is connected in a balanced manner across the subset loop and has interrogating and output means connected for utilization purposes. The arrangement illustrated controls a path for gating interrogating signals in response to loop voltage changes of a predetermined value. Loop changes due to ringing, voice currents and other factors from which no change signal is desired are advantageously less than the predetermined unblocking value and do not enable the circuit. The output signals from such a circuit include a signal of a first polarity indicative of a first change in loop condition, a signal of a second polarity indicative of a second change in loop condition, and an absence of output signal indicative of a steady loop condition, all of which signals are easily distinguishable, one from the other, though the loop conditions may be relatively similar.

One embodiment of the invention utilizes a dual-diode arrangement with a by-passing resistor and erase pulse means to provide for stabilizing the circuit so that loop voltage condition changes having a ramp characteristic, normally such as would cause a duplication in change outputs, cause only single output signals.

Various of the circuits described hereinafter provide additional advantages important in meeting the problems presented by changes of direct-current voltage within a loop condition, diode leakage, and other factors to be pointed out more completely hereinafter.

It is a feature of this invention that a capacitor and a Zener diode are utilized in series to perform a memory function.

Another feature of this invention relates to the use of a capacitor-diode blocking circuit to determine changes-in-condition of a subscriber subset loop.

A further feature of this invention resides in the adaptation of a capacitor in series with a Zener diode to provide persistent enablement of the diode in response to changes-of-condition in a subscriber subset loop for an indefinite period until interrogation by a dipulse generator and to furnish but a single output pulse for any condition change in response to continued interrogation by the generator.

An additional feature of this invention relates to the arrangement of a capacitor and a diode across a subset loop to provide immunity from longitudinal voltages in the subset loop and to eliminate any effects thereof on the supervision of the loop.

Another feature of this invention relates to the connection of a Zener diode in series with a capacitor to a subset loop in a manner to be "block-up" in response to interrogation pulses of both polarities and to be enabled in response to direct-current condition changes of both polarities in the subscriber loop.

Another feature of this invention relates to the use of a Zener diode and a capacitor in a blocking-up circuit with a source of dipulses to provide easily distinguished output pulses of opposite polarities indicative of opposite-sense loop changes. The blocking effect during any steady condition in the loop eliminates supervisory power consumption to a large degree.

A further feature of this invention relates to the arrangement across a subset loop of a gate including a capacitor and a Zener diode having a breakdown level such that ringing and voice currents are incapable of enabling the gate.

An additional feature of this invention in one embodiment thereof relates to the use of a dual-diode arrangement in series with a capacitor for eliminating duplication of output response in relation to slowly changing loop conditions.

Another feature of this invention in one of the embodiments thereof relates to the use of a resistor as a leakage path for by-passing the gating diode arrangement to improve the stability thereof.

These and other objects and features of this invention will be better understood upon consideration of the following detailed description and the accompanying drawing, in which.

Figure 3A:
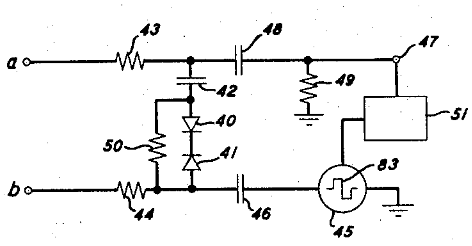
Figure 3B:
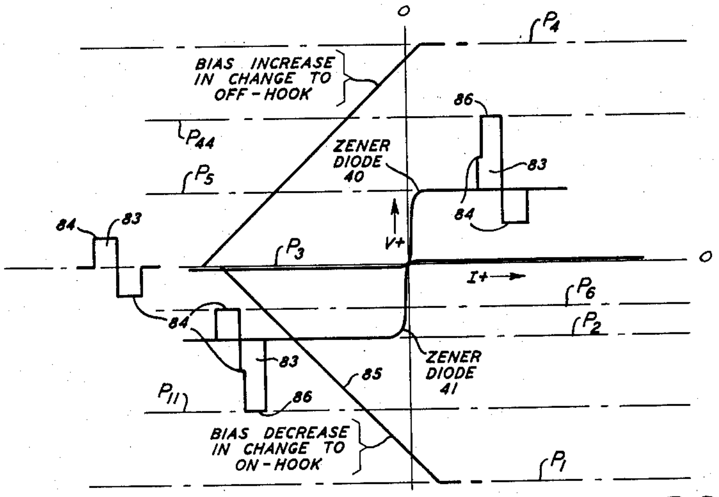

FIG. 3A is a schematic representation of another embodiment of the invention also adapted to provide sufficient margin for precluding the effect of changes in voltage within an operating condition and for stabilizing the circuit and improving the response with respect to slowly changing loop voltages; and FIG. 3B is a voltage-current diagram illustrative of the operational characteristics of the diodes of the circuit of FIG. 3A with the loop voltage changes and interrogating pulses superimposed thereon.

Figure 1A:
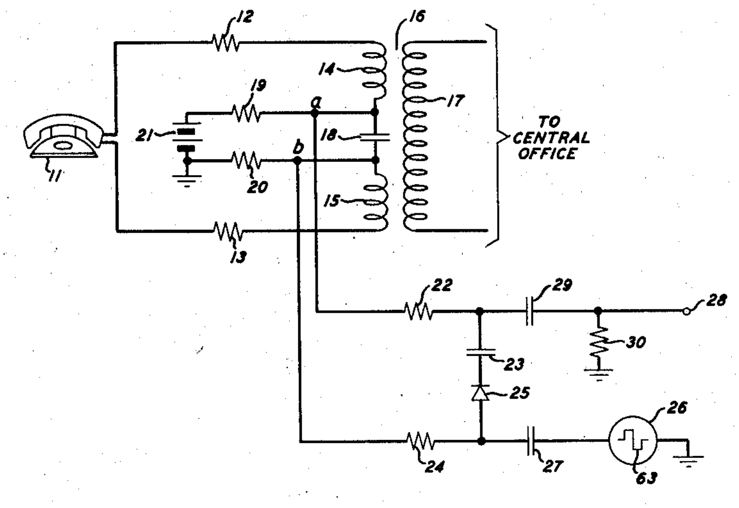
FIG. 1A is a schematic representation of a subscriber subset loop including a first embodiment of the present invention for determining changes-of-condition in a subscriber subset loop.

Referring now to FIG. 1A there is shown a subscriber subset loop including a subset 11, of a type displaying a very high impedance in the on-hook condition thereof and a low impedance in the off-hook condition, thereby providing a current path therethrough in the off-hook condition and substantially no path in the on-hook condition. The subset 11 is connected by two equal-valued resistors 12 and 13 to primary windings 14 and 15 of a transformer 16. The transformer 16 includes a secondary winding 17 connected to switching circuitry in remote line concentrator equipment, not shown, for connecting the subset 11 to a central office, also not shown. Connected between the primary windings 14 and 15 by equal-valued resistors 19 and 20 is a source of direct current 21, such as a battery, which furnishes power for operating the subset 11. A capacitor 18, of a value providing substantially no impedance to signals of audio frequency, is also interposed between the primary windings 14 and 15 for shunting voice and ringing signals around the source 21.

In the on-hook condition with substantially no path existing through the subset 11 due to the high impedance thereof, the voltage across the capacitor 18 is approximately that supplied by the source 21. On the other hand, in the off-hook or low impedance condition with an obvious direct-current path existing through the subset 11, the voltage across the capacitor 18 is maintained at a lesser constant value by the loop voltage drops. The voltages across the capacitor 18 for the on-hook and the off-hook conditions of the subset 11 are thus first and second predetermined constant values. These values may be utilized for signaling the conditions and the changes-of-condition in the subset loop.

Since the resistors 12 and 13, the resistors 19 and 20, and the primary windings 14 and 15 may be chosen to be substantially equal-valued pairs in the off-hook state of the subset 11, equal voltage drops occur on each side of the subset loop. Physically, the line which includes the resistor 12 lies parallel and adjacent to that including the resistor 13, and longitudinal currents induced in those lines oppose each other around the loop and cancel with respect to any effect on the ungrounded subset 11. Further, since the source 21 has substantially no resistance to such longitudinal currents and the resistors 19 and 20 are substantially equal, the longitudinal-current-caused voltage drops are the same across both the resistors 19 and 20, and the voltage across the capacitor 18 does not vary in the presence of longitudinal currents.

The two terminals of the capacitor 18 are described for reference hereinafter as points *a* and *b*. Connected to the points *a* and *b* in the circuit of FIG. 1A is a first embodiment of the supervisory circuits of this invention. The circuit thereof comprises a capacitor 23 and a Zener diode 25 connected in series between the points *a* and *b* by a resistor 22 and a resistor 24, respectively. An interrogating arrangement comprising a source of dipulses 26 is connected to the Zener diode 25 by a capacitor 27. An output circuit including an output terminal 28 and a resistor 30 is connected by a capacitor 29 to the series arrangement. The output terminal 28 is connected by alternating-current means, not shown, to the switching control circuitry of the central office, not shown, for relaying to that control circuitry signals indicative of the conditions and of the changes-in-condition of the subset loop.

As pointed out, supra, the use of a Zener diode and a capacitor in series in pulse-type circuits has been generally avoided because of the resulting undesirable blocking-up effect. A pulse traversing the diode tends to change the capacitor thereby back-biasing the diode upon termination and allowing no more pulses through. In contradistinction to the prior art, the circuits of this invention utilize the blocking-up effect of the capacitor-diode series arrangement to provide a supervisory network furnishing a single unique signal for each change-of-condition within the subset loop. The circuits of this invention make use of a bilateral diode, i.e., a Zener diode having both a forward and a reverse condition for transferring current, to provide the desired condition change indications.

Figure 1B:
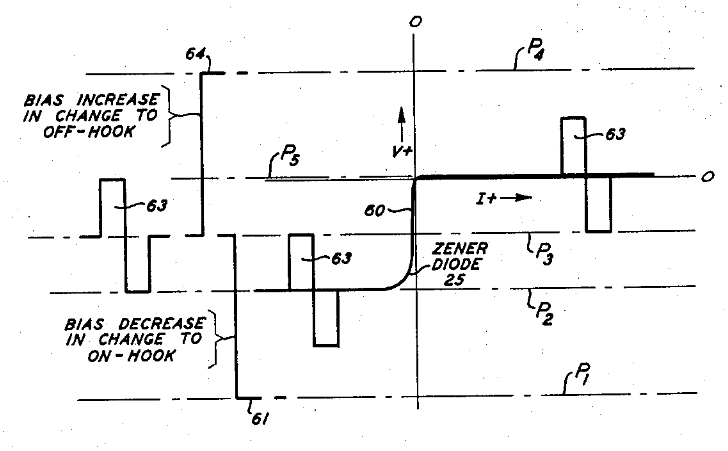
FIG. 1B is a voltage-current diagram illustrative of the operational characteristics of the Zener diode of the circuit of FIG. 1A with the loop changes and interrogating pulses superimposed thereon.

The operation of the circuit of FIG. 1A may be better understood by reference to FIG. 1B. FIG. 1B is a diagram of the voltage-current characteristic 60 of the Zener diode 25 with values of voltage changes due to direct-current loop changes and values of interrogating pulses superimposed thereon. The various potential levels are also noted generally thereon to aid in comparison. It is to be noted that the Zener diode characteristic 60 depicted in FIG. 1B, as well as those shown hereinafter in FIGS. 2B and 3B, is shown in slightly idealized form for purposes of clarity, the slight slopes that may be present in the characteristic 60 when the diode 25 is biased in the forward or reverse condition being omitted.

As described further below, when the loop circuit is in a steady-state condition, the voltage across the diode 25 is the difference between the zero voltage axis and the voltage level $P_3$, at which voltage level the diode 25 cannot conduct in either the forward or the reverse current direction. We shall assume that this initial bias condition $P_3$ is due to the steady off-hook condition of the subset 11. When the subset 11 goes on-hook, the loop circuit is interrupted and a high voltage condition is realized between the points *a* and *b*. The voltage applied across the Zener diode 25 increases in the back direction by the value of the direct-current loop change, illustrated in FIG. 1B as equal to the voltage between potential levels $P_1$ and $P_3$, as shown by the curve 61. This change is adapted, in accordance with an aspect of our invention, to be greater than the Zener level of the diode 25, illustrated by the difference between the potential levels $P_5$ and $P_2$. This increase in voltage biases the Zener diode 25 for reverse conduction and allows the capacitor 23 to charge, reducing the voltage across the diode 25 until it approaches the Zener breakdown level as illustrated at $P_2$. In this state a first positive half of an interrogating dipulse 63 from the source 26, indicated in FIG. 1B as potential level $P_2$, reduces the potential across the diode 25 and is not transferred to the output terminal 28. A second negative half of the dipulse 63 from the source 26 of an amplitude of one-half the Zener breakdown voltage increases the potential across the diode 25 to allow reverse conduction and is transferred by the capacitor 23 to the output terminal 28. At the terminal 28 the negative pulse is registered as indicative of a change to the on-hook condition in the loop.

During the transfer, the charge on the capacitor 23 increases, increasing the voltage thereacross by an amount equal to the pulse amplitude, the difference between the potential levels $P_2$ and $P_3$. On the termination of the negative pulse, the diode 25 is biased in the Zener region for nonconduction by the additional voltage across the capacitor 23 and the concomitant decrease thereof across the diode 25. The diode 25 is maintained thereafter in the middle of its nonconducting region, as illustrated at the potential level $P_3$ of FIG. 1B, so that neither the negative nor positive portions of a dipulse 63 from the source 26, indicated in FIG. 1B as varying about the potential level $P_3$, are transferred thereafter. All of the dipulses 63 are alike in shape but differ in the time of application to the circuit and in the result thereon due to the circuit condition. The absence of output pulses at the terminal 28 due to the nonconduction of the diode 25 is indicative of a steady-condition in the subset loop requiring no change by the switching control circuitry.

When the subset 11 goes off-hook and the voltage between the points *a* and *b* decreases sharply, the bias across the diode 25, which is in the reverse direction and equal to the difference between the potential levels $P_3$ and $P_5$, increases in the forward direction by the amount of the loop change illustrated in FIG. 1B by curve 64 and equal to the difference between potential levels $P_3$ and $P_4$. Because this change is sufficient to bias the diode 25 for forward conduction the capacitor 23 is allowed to discharge, decreasing the voltage thereacross to substantially the value of the voltage between the points *a* and *b*. The reduction in loop and capacitor voltages cause the diode 25 to become biased as at potential level $P_5$ with substantially no voltage thereacross other than the usual forward drop of the diode. A first positive half of an interrogating dipulse 63 from the source 26, indicated in FIG. 1B on the potential level $P_5$, after the change to off-hook increases the voltage in the forward direction across the diode 25 and is transferred to the output terminal 28 to register a change of the subset 11 to the off-hook condition. The positive pulse charges the capacitor 23 during transfer thereby so that upon its termination, the diode 25 is biased in its Zener nonconducting region as at potential level $P_3$. Thereafter neither positive nor negative pulses are transferred by the series circuit in the steady-state condition of the subset 11.

In the illustrative embodiment of the circuit of FIG. 1A, the elements thereof may assume the following characteristic values:

| | |
|---|---|
| Resistor 12 | 250 ohms. |
| Resistor 13 | 250 ohms. |
| Resistor 19 | 850 ohms. |
| Resistor 20 | 850 ohms. |
| Resistor 22 | 5K ohms. |
| Resistor 24 | 5K ohms. |
| Resistor 30 | 500 ohms. |
| Capacitor 18 | 2 $\mu$farads. |
| Capacitor 23 | .01 $\mu$farad. |
| Capacitor 27 | 0.2 $\mu$farad. |
| Capacitor 29 | 0.2 $\mu$farad. |
| Source 21 | 27 volts. |
| Breakdown level of Zener diode 25 | 6 volts. |
| Pulses from source 26 | ±3 volts, 50 $\mu$sec. |
| Off-hook impedance of subset 11 | 500 ohms. |

Specifically, the illustrated circuit of FIG. 1A with elements having values as set out above operates as follows. Assuming an initial on-hook condition of the subset 11, the voltage between the points *a* and *b* is approximately 27 volts. This voltage is applied across the capacitor 23 and the Zener diode 25, which as pointed out in the table above, has a six-volt breakdown level. Assuming that the subset has just gone on-hook, the Zener diode 25 is biased for reverse conduction to allow current for charging the capacitor 23. The capacitor 23 charges to approximately 21 volts, a stable condition due to the six-volt drop across the diode 25 furnishing the desired change-signal perseverence until interrogation. A first positive three-volt portion of dipulse 63 furnished by the source 26, which may be controlled by scanning equipment, not shown, is incapable of passing the diode 25 to register at the output terminal 28. The second negative three-volt portion of the dipulse 63, however, increases the voltage across the diode 25 causing reverse conduction thereof, and is transmitted by the diode 25 and the capacitor 23. The negative pulse is received at the output 28 as a signal indicative of a change to the on-hook condition of the loop.

The charging time of the capacitor 23 is advantageously adjusted such that the charge accumulated thereon during the one-half of the dipulse 63 from the source 26 which passes the diode 25 produces a voltage which is equal to the amplitude of the pulse transferred. Thus, as a negative pulse of three volts is transferred by the diode 25, the voltage across the capacitor 23 increases to substantially 24 volts. When the negative pulse is terminated, the diode 25 is biased by approximately three volts in the reverse condition. In this condition the Zener diode 25 will pass neither positive nor negative pulses of three volts or less, as illustrated in FIG. 1B.

Since no further interrogation pulses reach the output terminal 28 the supervisory circuit of FIG. 1A provides a first negative change-of-condition signal indicative of a change of the subset 11 to the on-hook condition and an absence of output signals thereafter during the maintenance of that on-hook condition. The absence of an output signal is interpreted as a steady-state condition of the loop.

On the other hand, when the subset 11 goes off-hook, the voltage between the points *a* and *b* decreases to approximately 10 volts. Substantially 10 volts is applied across the series arrangement including the Zener diode 25 and the capacitor 23, the voltage across which is initially 24 volts. The Zener diode 25 is biased for forward conduction and allows the discharging of the capacitor 23 which continues until the voltage across the capacitor 23 is approximately ten volts and that across the diode 25 is just less than the forward drop thereof. A first positive interrogating pulse of three volts from the source of bipolar pulses 26 biases the diode 25 for forward conduction and is transferred thereby. The positive pulse (positive half of dipulse) is transferred by the capacitor 23 and the capacitor 29 to the output terminal 28 to represent the change from the on-hook to the off-hook condition of the subset 11. During the interval of the positive pulse, the capacitor 23 discharges sufficiently to reduce the voltage thereacross by three volts. Upon termination of the positive pulse the capacitor 23 has substantially seven volts thereacross, and the diode 25 is biased in the Zener region for nonconduction by substantially three volts. A negative three-volt pulse from the source 26 and all other positive and negative pulses of three volts or less, such as the portions of dipulses 63 furnished by the source 26 thereafter, are incapable of biasing the diode 25 to conduct and are therefore incapable of transference by the Zener diode 25.

Thus the circuit of FIG. 1A furnishes a single positive indication of a change from the on-hook to the off-hook condition. After a first interrogation following a change, no additional signals are transferred to the output terminal 28 during the off-hook condition. Absence of signal may therefore be interpreted as a steady-state condition of the subset loop. Since the output signals at the terminal 28 are negative, positive, and absence of signal, they may be easily distinguished, one from the other, even though the actual loop voltages are relatively close and of the same polarity.

It is to be noted that the circuit of FIG. 1A is impervious to both ringing and voice currents in the loop. These currents are of audio frequency and are thus by-passed from the supervisory circuit by the capacitor 18. Additionally, it is to be noted that the resistors 22 and 24 are large with respect to the resistors 19 and 20, forming voltage divider networks therewith so that any audio signals which might be created by the scanning equipment or by the generator 26 reach the feed battery circuit substantially diminished in value. The values of the resistors 19 and 20 and of the capacitor 18 are such that these small signals are shunted to ground without affecting the loop.

The circuit of FIG. 1A utilizes a very small amount of operating power since in both steady conditions of the loop the diode 25 is biased for nonconduction and no current flow takes place therethrough. Of especial note is the fact that only two resistors, a capacitor, and a Zener diode with the interrogating source accomplish the supervisory functions.

Figure 2A:
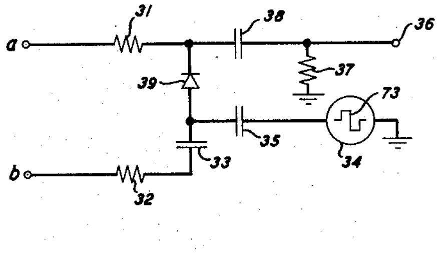
FIG. 2A is a schematic representation of a second embodiment of the invention especially adapted to provide a sufficient margin for precluding the effect of changes in voltage within an operating condition.
Figure 2B:
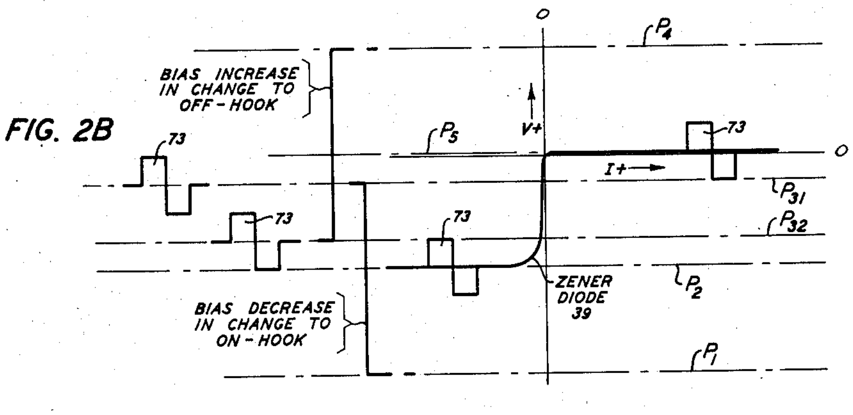
FIG. 2B is a voltage-current diagram illustrative of the operational characteristics of the Zener diode of the circuit of FIG. 2A with the loop voltage changes and interrogating pulses superimposed thereon.

Referring now to FIG. 2A there is illustrated another embodiment of the invention offering certain additional advantages with respect to providing margins for preclusion of the effect of ringing in the subset loop on the supervision thereof.

In certain subscriber subsets, ringing circuits utilize the subset feed battery, the source 21 of FIG. 1A, for amplification power. During ringing, current is drawn around the loop and the voltage between the points *a* and *b* of the circuit of FIG. 1A decreases. If this ringing occurs during interrogation, the small ringing voltage changes may add to the interrogation voltage to provide sufficient voltage to allow diode conduction and produce a false output signal. In accordance with this aspect of our invention, the circuit of FIG. 2A provides a safety margin for precluding such false outputs in the presence of ringing changes in the loop. This circuit utilizes a Zener diode having a breakdown voltage appreciably greater than twice the level of interrogating pulses. The breakdown voltage is adapted to be less than subset-condition-change-induced loop voltage changes so that loop changes unblock the diode while both interrogation and ringing voltages may be applied to the diode simultaneously without causing conduction.

For example, the supervisory circuit of FIG. 2A includes a Zener diode 39 connected between the points *a* and *b* by a resistor 31, a resistor 32, and a capacitor 33. Interrogating pulses are applied to the diode 39 by a source 34 of dipulses 73 through a capacitor 35. Output signals are received from the circuit at a terminal 36 across a resistor 37 after transference by a capacitor 38.

The operation of the circuit of FIG. 2A whereby the protective margin is obtained will be better understood by reference to FIG. 2B. In FIG. 2B there is illustrated an idealized voltage-current characteristic of a Zener diode such as the diode 39. Superimposed thereon for illustrative purposes are the interrogating pulse waveforms and waveforms illustrative of the voltage change on the diode 39 for direct-current loop changes. Upon a first change of the subset 11 to the on-hook condition, a change voltage such as that between potential levels $P_{31}$ and $P_1$, advantageously greater than the Zener value of the diode 39, is applied in the reverse direction across the diode 39 to bias that diode for reverse conduction. The conduction by the diode 39 allows the capacitors 35 and 38 to charge to reduce the biasing voltage applied across the diode 39 to potential level $P_2$, whereupon the diode 39 ceases conducting with the biasing maintained at the Zener level thereacross. If a positive interrogating pulse, such as one-half of dipulse 73, of less than the Zener value is applied, the voltage across the diode 39 is reduced, and it is rendered nonconducting. A negative interrogating pulse of less than half the Zener value, however, increases the voltage across diode 39 sufficiently to allow reverse conduction and additional charging of the capacitor 33. Upon the termination of the negative pulse, the voltage across the diode 39 is reduced to a value equal to the difference between the potential levels $P_5$ and $P_{32}$ so that the diode 39 is maintained in the Zener nonconducting region. It is to be noted that at this value of bias, a positive interrogating pulse 73 and an additional positive pulse, such as might be caused by ringing tone amplification, may be present at the same instant without causing the diode 39 to conduct in its forward direction.

On a change to the off-hook state, the voltage across the diode 39 reverses and substantially the same operation takes place as set out hereinbefore, except that the safety margin now provided eliminates the effect of negative going loop changes during negative pulse interrogation.

In one exemplary embodiment of the circuit of FIG. 2A the various elements may take the following illustrative values:

| | |
|---|---|
| Resistor **31** | 10 KΩ. |
| Resistor **32** | 10 KΩ. |
| Resistor **37** | 500Ω. |
| Capacitor **33** | .05 μf. |
| Capacitor **35** | .01 μf. |
| Capacitor **38** | .01 μf. |
| Breakdown level of diode **39** | 10 volts. |
| Pulses from source **34** | ±3 volts, 50 μsec. |

The operation of the circuit of FIG. 2A with elements of the foregoing illustrative values is as follows. An initial change of the subset 11 to the on-hook condition places 27 volts between the points *a* and *b*. This voltage biases the diode 39 for reverse conduction allowing the capacitor 33 to charge to seventeen volts; the capacitor 38, to twenty-seven volts; and the capacitor 35, to seventeen volts. It is to be noted that the capacitors 33, 35, and 38 are adjusted such that the time constant for charging the capacitor 33 is quite long compared to the time constants of the other two capacitors; and the buildup due to interrogation therefore is accomplished on the capacitors 35 and 38.

A first positive pulse of three volts from the source 34 provides but seven volts in the reverse direction across the diode 39 and is not transmitted thereby. A negative three-volt pulse however biases the diode 39 for reverse conduction, presents a negative output at the terminal 36, and changes the charge on the capacitors 35 and 38 such that on the termination of the negative pulse the Zener diode 39 has but seven volts thereacross and further three-volt pulses of either polarity are not transmitted. Additionally, at least a seven-volt change is required to forward-bias the diode 39; and, even in the presence of a positive three-volt interrogating pulse, a four-volt safety margin is provided to allow for ringing-signal-amplification voltage drop between the points *a* and *b*.

When the subset 11 goes off-hook and the voltage between the points *a* and *b* drops to ten volts, the diode 39 is biased for forward conduction to allow each of the capacitors 33, 35, and 38 to discharge to 10 volts. A first positive interrogating pulse of three volts from the source 34 forward-biases the diode 39, charges the capacitors 35 and 38, and is transmitted as an easily distinguished positive output pulse indicative of a subset change to off-hook. On removal of the positive pulse, the diode 39 is biased in the Zener region by three volts so that pulses of either polarity from the source 34 are incapable of passing the diode and a safety margin of four volts is provided for fluctuations in the increasing voltage direction between the points *a* and *b* during the off-hook state. In addition to the aforementioned safety margins, the circuit of FIG. 2A provides the advantages of the circuit of FIG. 1A.

It is to be noted that the safety margin of the circuit of FIG. 2A could also be provided in the circuit of FIG. 1A by reducing the value of interrogating dipulses 63 or by increasing the Zener level of diode 25.

Referring now to FIG. 3A there is shown another embodiment of the supervisory circuits of this invention which furnishes a safety margin in both polarity directions for eliminating the effect of small direct-current changes in the loop during the supervision thereof and, additionally, provides stability and a single output signal for any slowly changing loop condition.

If the direct-current loop voltage change in response to a subset change takes place slowly compared to the interrogation rate, a supervisory circuit may register a plurality of change indications, one signal for each voltage change sufficient to unblock the arrangement. This is obviously undesirable since switching is required but once to connect or disconnect a subscriber, and continual change indications require circuit means for disregarding the redundant signals. The circuit of FIG. 3A is advantageously adapted to provide but a single output in the presence of such slow loop voltage changes.

The circuit of FIG. 3A utilizes first and second Zener diodes 40 and 41 and a capacitor 42, connected in series between the points *a* and *b* by resistors 43 and 44, respectively. Interrogating and erase pulses are furnished by a source 45, which may comprise any of a number of well-known circuits for producing pulses of a type described hereinafter. The source 45 is coupled to the series arrangement by a capacitor 46. An output terminal 47 is coupled to the series arrangement by a capacitor 48 and connected to ground by a resistor 49. A large resistor 50 is connected in shunt with the diodes 40 and 41.

The operation of the circuit of FIG. 3A will be better understood by referring to FIG. 3B. The FIG. 3B illustrates the idealized voltage-current characteristics of the substantially-identical Zener diodes 40 and 41 with the changes in biasing voltages and interrogating pulses illustrated thereon for ease of visualization. It is to be noted that the characteristic of diode 40 is reversed in polarity on the plot to illustrate the reverse connection thereof in the circuit. Each diode 40 and 41 has a Zener or breakdown voltage greater than twice the amplitude of an interrogating pulse from the source 45. The resistor 50 is quite large compared to the output resistor 49. Thus, upon a slow change of the subset 11 to on-hook, the voltage applied across both of the diodes 40 and 41, by an initial portion of the ramp or other slow loop change sufficient to unblock the arrangement, equal to the difference between the potential levels $P_{11}$ and $P_3$, for instance, biases the diodes 40 and 41 to allow current flow to charge the capacitor 42, the diode 40 conducting in the forward direction and the diode 41 in the reverse direction. The charge on the capacitor 42 increases until the loop voltage change which has taken place is distributed between the diode 41, biased at the Zener breakdown level $P_2$, and the capacitor 42. A first positive half of a dipulse 83 of an interrogation amplitude 84 is incapable of biasing the diode 41 for conduction, while a negative half of the dipulse 83 is transferred by both of the diodes 40 and 41, charges the capacitor 42, and is received at the output terminal 47 as a signal indicative of a change of the subset 11 to the on-hook condition. The charge remaining on the capacitor 42 upon the termination of the negative pulse is such that the voltage thereacross would be sufficient, neglecting the slow charging path through the resistor 50, to back-bias the diode 41 in its nonconducting region and provide a safety margin to preclude ringing voltages from producing outputs. However, if as illustrated by the ramp characteristic 85 of FIG. 3B the change to the on-hook voltage value between *a* and *b* continues and after a first interrogation, the voltage therebetween increases, a next negative interrogating pulse 83 is also capable of biasing the diode-capacitor arrangement for reverse conduction to produce a spurious output.

To preclude this effect, a circuit 51 for providing erase pulses is provided at the output terminal 47. The circuit 51 is operative responsive to the leading edge of an output pulse to cause the source 45 to increase the amplitude of the interrogating pulse 83 being transmitted to the Zener value of the diodes 40 and 41. This anticipatory increase of the interrogating pulse 83 being transferred to the erasing level 86 charges the capacitor 42 such that substantially all of the then present loop voltage is immediately thereacross and upon the termination of the pulse 83 both of the diodes 40 and 41 have substantially no bias potential applied thereacross, the potential level being as at level $P_3$. In this state no interrogating pulses can pass the diode arrangement and a substantial margin, the Zener value, is provided for further change of the loop voltage in either polarity direction without causing output at the terminal 47. The resistor 50 provides a path for allowing the biasing across the diodes 40 and 41 to reach the zero level and for maintaining the capacitor 42 in the completely-charged stable state for any further changes. Additionally the path provided by the resistor 50 operates to preclude any effect which imperfect diodes might have on leakage of the charge on the capacitor 42.

A change in loop voltage to the off-hook value operates in a substantially identical manner.

In one specific embodiment of the circuit of FIG. 3, the elements may take the following illustrative values:

| | |
|---|---|
| Resistor 43 | 5K ohms. |
| Resistor 44 | 5K ohms. |
| Resistor 49 | 500 ohms. |
| Resistor 50 | 5 megohms. |
| Capacitor 42 | 0.02 μfarad. |
| Capacitor 46 | 0.2 μfarad. |
| Capacitor 48 | 0.2 μfarad. |
| Breakdown level of the diode 40 | 10 volts. |
| Breakdown level of the diode 41 | 10 volts. |
| Pulses from the source 45: | |
| Interrogate (level 84) | 3 volts, 50 μsec. |
| Erase (level 86) | 10 volts, 50 μsec. |

Specifically, in the above embodiment, a change of the voltage in changing to on-hook between the points *a* and *b* to twenty volts, as illustrated by the difference in potential along the negative ramp between the levels $P_3$ and $P_{11}$ in FIG. 3B for instance, biases the diode 40 for forward conduction, biases the diode 41 for reverse conduction, and allows the capacitor 42 to charge to ten volts. A negative portion of the interrogating pulse 83 of three volts, the interrogating level 84, is transmitted to the output terminal 47 and the leading edge thereof operates the circuit 51 to increase the same negative interrogating pulse 83 to the erase level 86 of ten volts. This increase charges the capacitor 42 to twenty volts which, on termination of the negative pulse, removes any biasing potential from both diodes 40 and 41 (level $P_3$ of FIG. 3B). Thereafter no three-volt interrogating pulse may pass to the output terminal 47. Additionally, the further charging of the capacitor due to the additional voltage change to twenty-seven volts between the points *a* and *b* does not allow conduction, for though the diode 40 is biased for forward conduction, the diode 41 is biased by seven volts for nonconduction as at level $P_6$ and no additional interrogating pulses are passed. The resistor 50 provides a circuit for charging the capacitor 42 to the full value of the loop voltage thereby removing the seven volts biasing the diodes 40 and 41 and again providing a ten-volt margin for small loop changes in either direction.

A slow change of the voltage between the points *a* and *b* to the ten-volt off-hook level accomplishes the same result, relaying a single positive output from the terminal 47. Both the diodes 40 and 41 are originally biased by such a change to allow the capacitor 42 to discharge and the diode 40 to become biased at its Zener level as at a level $P_5$. A positive three-volt interrogation pulse 83 is transmitted, initiates the circuit 51 to increase the positive amplitude of the pulse to ten volts, and decreases the charge on the capacitor 42 to the immediate value of the voltage between points *a* and *b*. When the pulse terminates, the bias on both of the diodes 40 and 41 is removed, as at level $P_3$, and neither further interrogation nor loop changes, except from one subset condition to the other has an effect thereon.

The circuit 51 may include any well-known circuitry for causing the source 45 to increase the level of a pulse being furnished. Alternatively, the source 45 may include a first circuit for furnishing pulses of an interrogating level and a second circuit in parallel therewith for furnishing pulses of the erase level upon activation by circuit 51 and the concomitant deactivation of the first circuit.

The value of the resistor 50 in providing stable operating conditions is to be especially noted. Any leakage of the diodes 40 or 41 has no effect on the capacitor 42 which is connected to measure the whole voltage between the points *a* and *b*. Additionally the use of ten-volt Zener diodes which are maintained in the nonbiased state by the resistor 50 provides that ringing amplification currents and other fluctuations in the loop of less than seven volts, a relatively high value, have no effect on interrogation.

It is to be understood that the above-described arrangements are illustrative of the applications and the principles of the invention. Numerous other arrangements may be devised by those skilled in the art without departing from the spirit and scope of the invention.

What is claimed is:

1. A circuit for supervising changes-in-condition in a subscriber subset loop of a telephone system comprising in combination a subset loop including a telephone subset, a source of direct current for energizing said subset, and first and second equal impedances on opposite sides of said loop connecting said source to said subset; a serial arrangement including a Zener diode and a capacitor; means connecting said serial arrangement to said first and said second impedances; means for interrogating said serial arrangement connected thereto to determine the conduction state of said serial arrangement; and output means connected to said serial arrangement and responsive to the determination of the conduction state thereof.

2. A circuit as in claim 1 including a second Zener diode in said series arrangement.

3. A circuit as in claim 1 wherein said Zener diode has a predetermined breakdown level less than twice the amplitude of direct-current voltage changes in the loop to be registered at said output means, and wherein said means for interrogating said arrangement includes means for alternately furnishing pulses of opposite polarity and of not greater than one-half of said predetermined breakdown level.

4. A supervisory circuit for determining changes in the direct-current condition of a subscriber subset loop comprising a serial arrangement including a diode and a first capacitor, means connecting said serial arrangement across the subset loop to be responsive to the changes in the loop, means for furnishing interrogating pulses to said serial arrangement, and output means responsive to the delivery of said interrogating pulses to said serial arrangement for transferring signals indicative of changes in said direct-current condition from said serial arrangement.

5. A supervisory circuit as in claim 4 wherein said diode is a first Zener diode having a predetermined breakdown level less than twice the amplitude of subset loop voltage changes, and wherein said means for furnishing interrogating pulses includes source means for alternately furnishing pulses of opposite polarity and first amplitude less than one-half of said breakdown level.

6. A circuit as in claim 5 including a second Zener diode having a breakdown level substantially equal to said breakdown level of said first diode serially arranged with said first Zener diode, and shunting means connected in parallel with said first and said second diodes.

7. A circuit as in claim 6 including erase pulse controlling means connected and operative in response to signals at said output means for causing said source means to increase the amplitude of the pulse being furnished to said breakdown level of each of said diodes.

8. A supervisory circuit as in claim 4 wherein said means connecting said serial arrangement across the subset loop includes a first resistor connected to one side of the subset loop and to said diode, and a second resistor connected to the opposite side of the subset loop and to said capacitor.

9. A supervisory circuit as in claim 4 wherein said means for furnishing interrogating pulses comprises a pulse source and a second capacitor connecting said pulse source to said serial arrangement; and wherein said output means includes an output terminal, and a third capacitor connecting said terminal to said serial arrangement.

10. A supervisory circuit as in claim 9 wherein said second capacitor is connected to said serial arrangement between said diode and said first capacitor, and said third capacitor is connected to said diode.

11. A supervisory circuit as in claim 9 wherein said second capacitor is connected to said diode, and said third capacitor is connected to said first capacitor.

12. A supervisory circuit for determining changes-of-condition in a telephone subscriber subset loop comprising a first capacitor; a Zener diode having a predetermined breakdown level less than twice the amplitude of changes to be measured in the subset loop connected in series with said first capacitor; a first resistor connected to said first capacitor and to one side of the subset loop; a second resistor connected to said Zener diode and to the other side of the subset loop; a source of alternate pulses of opposite polarity of an amplitude less than one-half of said predetermined breakdown level; a coupling capacitor connecting said source to said Zener diode; and output means including an output resistor of a value small in comparison to said first and second resistors, and an output coupling capacitor connecting said first capacitor to said output resistor.

13. A supervisory circuit for signaling changes-of-condition in a telephone subscriber subset loop comprising a first capacitor of a first value, a Zener diode having a predetermined breakdown level connected to said first capacitor, a first and a second resistor connected respectively to opposite sides of the loop and in a serial arrangement with said Zener diode and said first capacitor, a source of dipulses of an amplitude less than one-half of said predetermined breakdown level, a coupling capacitor connecting said source between said first capacitor and said Zener diode, output means, and an output capacitor connecting said output means between said diode and said first resistor, said predetermined breakdown level being less than the sum of the amplitudes of a change in voltage in the loop to be signalled and of one of said dipulses.

14. A supervisory circuit for determining changes-of-condition in a telephone subscriber subset loop comprising a first capacitor; a first and a second Zener diode serially arranged with said capacitor, each of said diodes having substantially the same Zener lever, said level being of an amplitude less than loop voltage changes to be determined; a first resistor shunting said first and second diodes; a second and a third resistor connected respectively to opposite sides of the subset loop and serially arranging said diodes and said first capacitor across the subset loop; means for producing alternate pulses of opposite polarities of an amplitude less than one-half of said Zener level; a coupling capacitor connecting said last-mentioned means to said second diode and said third resistor; output means including an output resistor of a value small in comparison to the value of said first resistor, and an output capacitor connecting said output resistor to said first capacitor and said second resistor; and means connected to and operative in response to an output at said output means for operating said means for producing alternate pulses to increase the amplitude of the pulse being produced to said Zener level.

15. A circuit for signaling changes in voltage of a predetermined amplitude in a subset loop of a telephone system comprising in combination a subset loop, current conducting means, and means for enabling said current-conducting means responsive to changes in voltage of a predetermined amplitude in said loop, said enabling means including means connecting said current-conducting means to measure the voltage changes in said loop, source means for furnishing alternate pulses of equal amplitude and opposite polarity to said current-conducting means, utilization means coupled to said current-conducting means, and means operative responsive to the conduction of a pulse from said source means by said current-conducting means to disable said current-conducting means.

16. A circuit for signaling changes in voltage of a predetermined amplitude in a subset loop of a telephone system comprising a Zener diode having a Zener voltage amplitude less than twice the predetermined amplitude of changes to be signaled in the loop, means connecting said diode across the loop, a source of equal-value opposite-polarity pulses of an amplitude not greater than one-half of said Zener voltage amplitude connected to said diode, utilization means coupled to said diode, and means operative responsive to the transmission of a pulse from said source by said diode to said utilization means to place said diode in the nonconducting region.

17. A memory circuit comprising a series arrangement including a Zener diode having a predetermined breakdown level, and a capacitor; means for applying bipolar control potentials across said series arrangement of an amplitude greater than one-half of said breakdown level; source means for applying bipolar interrogating signals to said arrangement of an amplitude less than one-half of said breakdown level; and output means operative responsive to any of said interrogating signals transferred by said arrangement.

18. A memory circuit as in claim 17 wherein said series arrangement further comprises a second Zener diode having said predetermined breakdown level, and means shunting both of said diodes; and wherein said output means further comprises means connected to said source means and operative in response to interrogating signals transferred by said series arrangement for causing said source means to increase the amplitude level of said interrogating signals to said breakdown level.

19. A telephone circuit comprising a substation line, a capacitor, a source of pulses connected to said capacitor, utilization means connected to said capacitor, means responsive to a service request condition on said line to transmit pulses from said source through said capacitor to said utilization means, and means responsive to the charging of said capacitor to preclude the transmission of further pulses to said output means.

20. A telephone circuit comprising a subscriber line, a capacitor, a source of interrogating pulses connected to said capacitor, output means connected to said capacitor, conductive means responsive to a service request condition on said line for conductively coupling said source of pulses to said capacitor to charge said capacitor and to transmit a signal to said output means, said conductive means being responsive to the charging of said capacitor to preclude the transmission of further signals from said source to said output means, and additional means for discharging said capacitor.

21. A telephone circuit comprising a substation line, a diode, a capacitor, a source of interrogating pulses, utilization means connected to said capacitor, and means responsive to a service request condition on said line for energizing said diode to transmit pulses from said source through said capacitor to charge said capacitor and to deliver a service request signal to said utilization means, said diode being responsive to the charging of said capacitor to inhibit further transmission of pulses through said capacitor to said utilization means.

22. A circuit for a subscriber subset loop comprising a capacitor, a source of interrogating pulses, utilization means, and means for delivering pulses through said capacitor to activate said utilization means in response to a service request on said line, said capacitor charging in response to the delivery of said pulses therethrough to prevent the transmission of additional signals to said utilization means after a predetermined interval.

No references cited.